United States Patent [19]
Anderson et al.

[11] Patent Number: 5,287,328
[45] Date of Patent: Feb. 15, 1994

[54] METHOD FOR REMOVING RANDOM SOURCE AND RECEIVER NOISE FROM SEISMIC TRACES

[75] Inventors: John E. Anderson, Richardson; Michael A. Jervis, Austin; Robert G. Keys, Dallas, all of Tex.

[73] Assignee: Mobil Oil Corporation, Fairfax, Va.

[21] Appl. No.: 10,097

[22] Filed: Jan. 28, 1993

[51] Int. Cl.$^5$ .............................................. G01V 1/36
[52] U.S. Cl. .................................... 367/38; 367/43/47
[58] Field of Search .................. 367/38, 43, 47, 59, 367/63, 21

[56]  References Cited
U.S. PATENT DOCUMENTS 4,964,102  10/1990  Kelly et al. ........................... 367/47

OTHER PUBLICATIONS

"Surface Consistent Corrections", Geophysics, vol. 46, No. 1 (Jan. 1981) pp. 17–22, M. Turhan Taner and Fulton Koehler.

Primary Examiner—Ian J. Lobo
Attorney, Agent, or Firm—Alexander J. McKillop; George W. Hager, Jr.

[57] ABSTRACT

Recorded seismic traces are gathered into common offset groups. Within each group, the traces are arranged according to shot point number. Mean and standard deviations are determined for each trace. High frequency amplitude variations in the mean and standard deviations caused by variations in source strengths and receiver calibrations are removed to produce traces of low frequency amplitude variations representing subsurface geology or wave propagation effects.

9 Claims, 12 Drawing Sheets

METHOD FOR REMOVING RANDOM SOURCE AND RECEIVER NOISE FROM SEISMIC TRACES

BACKGROUND OF THE INVENTION

In seismic exploration, it is common practice to deploy a large array of geophones on the surface of the earth and to record the vibrations of the earth at each geophone location to obtain a collection of seismic traces. The traces are sampled and recorded for further processing. When the vibrations so recorded are caused by a seismic source activated at a known time and location, the recorded data can be processed by a computer in known ways to produce an image of the subsurface. The image thus produced is commonly interpreted by geophysicists to detect the possible presence of valuable hydrocarbons.

Seismograms are commonly recorded as digital samples representing the amplitude of received seismic reflection signals as a function of time. Since seismograms are usually obtained along a line of exploration on the surface of the earth, the digital samples can be formed into an array (t-x) of seismic traces with each sample in a trace representing the amplitude of the seismic trace as a function of time (t) and horizontal distance (x), When such traces are visually reproduced, by plotting or the like, seismic sections are produced. A seismic section depicts the subsurface layering of a section of the earth. It is the principal tool which the geophysicist studies to determine the nature of the earth's subsurface formation.

While the amplitudes of the received seismic reflection signals contain information about the earth's subsurface, such amplitudes are also influenced by the seismic energy sources and receivers that are used to create and record the seismic signals. Differences in source strength and receiver sensitivity, or calibration, cause random amplitude variations, a noise in the seismic reflection's signals, that must be removed in order to extract useful amplitude information.

The standard method for removing the effects of source and receiver variations is called surface consistent amplitude correction and is discussed in detail in "Surface Consistent Corrections" by M. T. Taner and F. Koehler, *Geophysics*, v.46, No.1, pages 17–22 (1981). In this method, the seismic data are modeled as a product of four scale factors. These factors are (1) a source performance factor, (2) a receiver performance factor, (3) an offset dependent factor, and (4) a subsurface or common midpoint point factor. In this method, an amplitude factor A is computed for each trace. Assuming that the amplitude factor is a product of the source, receiver, offset, and midpoint factors (denoted S, R, H and K respectively), the natural logarithm of A is the sum of the logarithms of the individual factors:

$$\log(A) = \log(S) + \log(R) + \log(H) + \log(K).$$

Denoting the logarithms of these factors by A', S', H' and K' yields a single equation in four unknowns. Each trace provides one equation. The total number of equations is equal to the number of traces in the seismic line. Although the number of traces depends on the recording geometry, generally, the number of traces is equal to the product of the number of sources times the number of receivers. The number of unknown performance factors is equal to the sum of the number of sources, the number of receivers, the number of offsets, and the number of midpoints. This system of equations is solved with an optimization criterion to determine the performance factors that best match the amplitude factors. Amplitude balancing is then accomplished by applying the source and receiver performance factors, determined from the optimization problem, to the individual seismic traces.

SUMMARY OF THE INVENTION

In accordance with the present invention, there is provided a method for removing amplitude variations in recorded seismic reflection signals due to random source strengths and receiver sensitivities that does not rely on the surface consistent amplitude balancing approach as described in the aforementioned article by Taner and Koehler.

In the present invention, recorded seismic traces are separated into groups of common source-to-receiver offsets. Within each common offset group, the traces are arranged according to shot point number. Mean and standard deviations are determined for each trace within each common offset group. High frequency amplitude variations in the determined mean and standard deviations caused by variations in source strengths and receiver calibrations are removed to produce seismic traces that preserve low frequency amplitude variations representing subsurface geology or wave propagation effects.

More particularly, a mean series is produced by indexing the determined means within each common offset group of traces sequentially according to trace number. A standard deviation series is produced by indexing the determined standard deviation within each common offset group of traces sequentially according to trace number. Both the mean and standard deviation series are filtered with a low pass filter to remove high frequency variations due to source strength differences and receiver calibrations while maintaining low frequency variations due to subsurface geology or wave propagation effects. Each seismic trace is then scaled such that its mean and standard deviation is equal to the filtered mean and standard deviation for that trace, thereby removing amplitude variations due to receiver calibration differences and source strength differences from the trace.

DESCRIPTION OF THE PREFERRED EMBODIMENT

Figure 1:
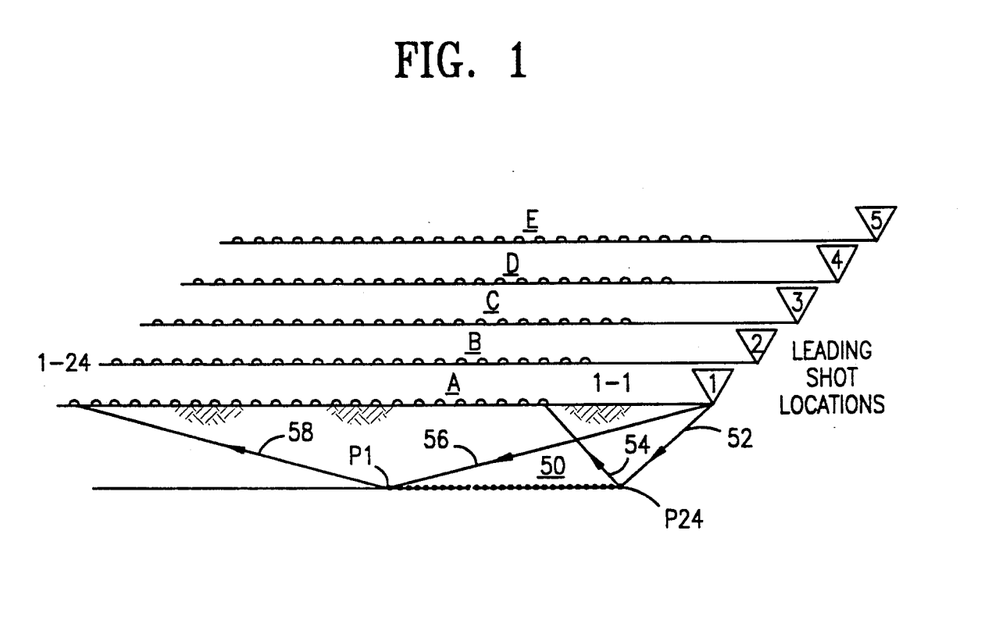
FIG. 1 illustrates a multiple-coverage seismic exploration technique.

Referring to FIG. 1, there is illustrated a field technique that might be used for producing multiple coverage seismic data which is suitable for use in carrying out the invention. Five field layouts A-E are utilized for purposes of illustration and are placed one above the other in FIG. I for ease in representing the overlapping coverage. In these field layouts, seismic energy is produced during a first recording at shotpoint 1, for example, and seismic reflection signals are detected along the receiver spread A, containing 24 receivers. These receivers receive reflection signals from subsurface interfaces such as the interface 50. Reflection signals are received from other subsurface interfaces also by the receivers of spread A, but only interface 50 is illustrated for clarity. For example, a signal produced at the nearest receiver in spread A to the shotpoint 1, and designated as receiver 1-1, delineates depth point P24 on the subsurface interface 50. Throughout the specification reference characters identifying receiver stations give the shotpoint number first and then the receiver number. Seismic energy travels downward from shotpoint 1 by way of raypath 52 and is reflected upward to the receiver 1-1 by way of raypath 54. Likewise, seismic energy travels downward by way of raypath 56 to depth point P1 where the energy is reflected upward by way of raypath 58 to the far receiver 1-24. A reproducible recording is made from each of the receivers in spread A. Usually in seismic exploration, magnetic tape recordings are made on a multichannel recording device. These magnetic tape recordings can then be processed to provide for a visual multitrace recording in which the output of each receiver is represented by a single seismic trace.

Now for a second recording, the receiver spread is advanced to the position of spread B as illustrated in FIG. 1. Likewise, the shotpoint advances to shotpoint 2. Again, a multichannel recording is made from seismic reflections received at each receiver of spread B, as seismic energy generated at shotpoint 2 is reflected from the subsurface interface 50. The process of moving the shotpoint and receiver spreads continues through shotpoint 5 and spread E. It can be appreciated that any number of spread configurations or layouts may be utilized along with any number of recordings, only five recordings for spreads A-E being illustrated in FIG. 1 by way of example.

Figure 2:
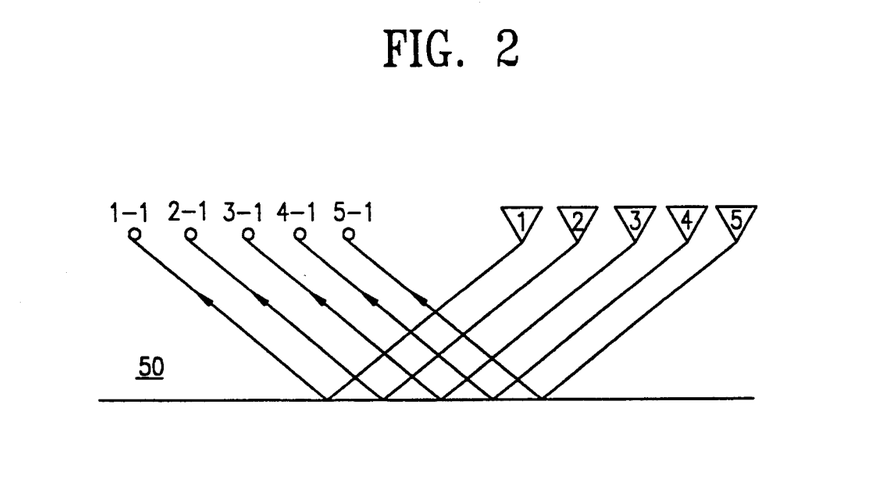
FIG. 2 illustrates a set of source-to-receiver relationships from FIG. 1 wherein the source-to-receiver spacings are identical.

It can be observed from FIG. 1 that in each of the recordings the distance along the surface of the earth from the shotpoint to each receiver remains the same. More particularly, the distances from each of the shotpoints to the nearest or first receiver along the surface of the earth is identical. Hence, this type of coverage has been termed common offset coverage. This common offset relationship of the seismic signals received by the nearest receiver at the receiver positions 1-1, 2-1, 3-1, 4-1 and 5-1 is illustrated in FIG. 2. There will be a similar common offset relationship for each of the remaining receivers with the five shotpoints, these relationships not being illustrated, however.

Each of the seismic receivers detects an incoming seismic reflection signal and converts it to a form useful for recording as a seismic trace. Ideally the receiver's output signal should be a linear function of its input signal. However, each receiver's output signal also depends on its individual sensitivity characteristics of gain and bias. Receiver calibration is normally accomplished by equalizing the gains and biases of the individual receiver. One major difficulty with this calibration process is that direct measurements of the gain and bias of individual receivers are often impossible. Consequently, unequalized receiver gains and biases will cause unwanted random noise in the form of amplitude variations in the various receiver output signals. Since the seismic reflection input signal to a collection of receivers does not vary significantly from one receiver to the next, the most rapid variation between receiver output signals is due to receiver gain and bias miscalibration.

The present invention is directed to a method of removing such random noise from seismic receiver outputs due to receiver miscalibrations by utilizing two quantities that can be determined from the outputs, the mean and standard deviation. If each seismic trace is viewed as a receiver, the standard deviations of the trace can be viewed as the receiver gain and the mean of the trace can be viewed as the receiver bias. The occurrence of high frequency variations in the mean and standard deviations between adjacent traces indicates that receiver bias and gain respectively varies from trace to trace. The input seismic reflection signal is responsible for the low frequency variations in the mean and standard deviations.

By applying a low pass filter to the mean and standard deviation of each receiver output, the resulting mean and standard deviations will approximate the mean and standard deviations that would have been observed if the receivers had been properly calibrated with the same gain and bias. Indexing of the receivers is crucial to the method of the present invention. The receivers must be ordered so that the input signal varies slowly with respect to the receiver index, while miscalibration errors vary rapidly as a function of receiver index.

Figure 3:
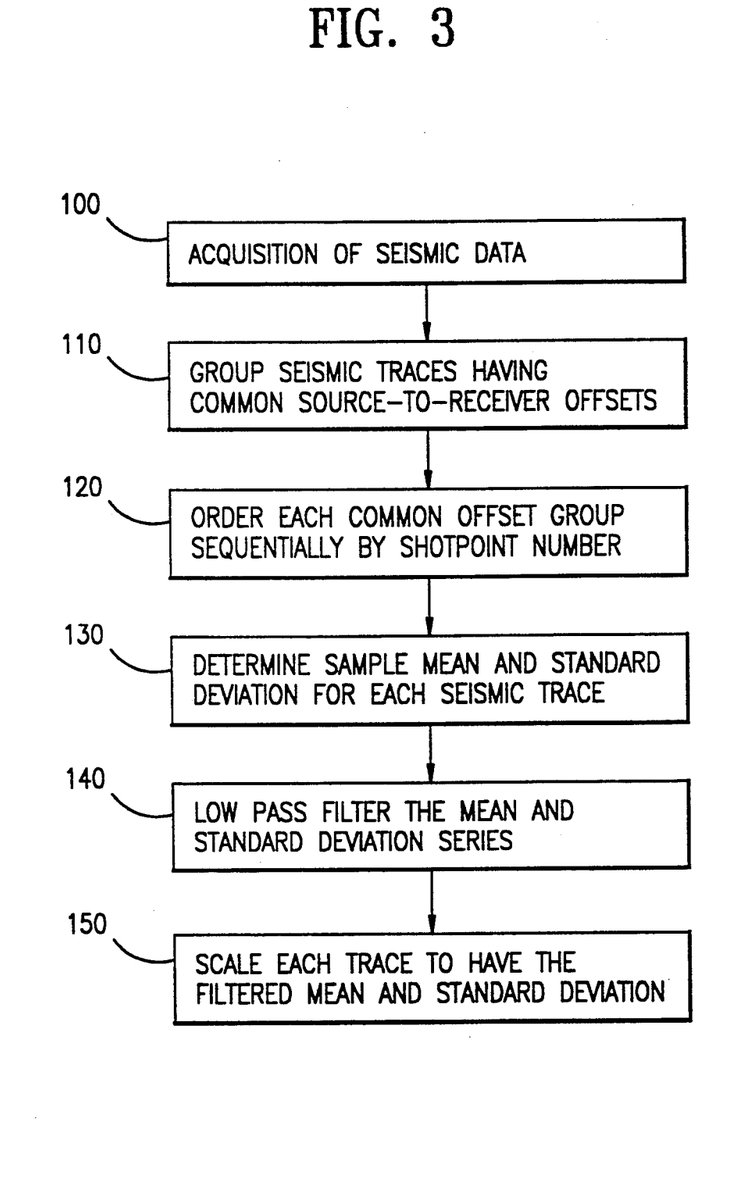
FIG. 3 is a flow chart of the steps carried out in accordance with the method of the present invention for removing random noise of source and receiver variations from recorded seismic traces.

Referring now to FIG. 3, there is illustrated a flow chart of the method of the present invention of calibrating seismic data by removing random noise due to source and receiver variations from recorded seismic traces. The method commences at step 100 with the acquisition of seismic data using any one of numerous well-known seismic exploration techniques, such as that described above and illustrated in FIG. 1. Proceeding to step 110, the seismic traces recorded in step 100 are gathered into groups having common source-to-receiver offsets as also described above and illustrated in FIG. 2.

Figure 4:
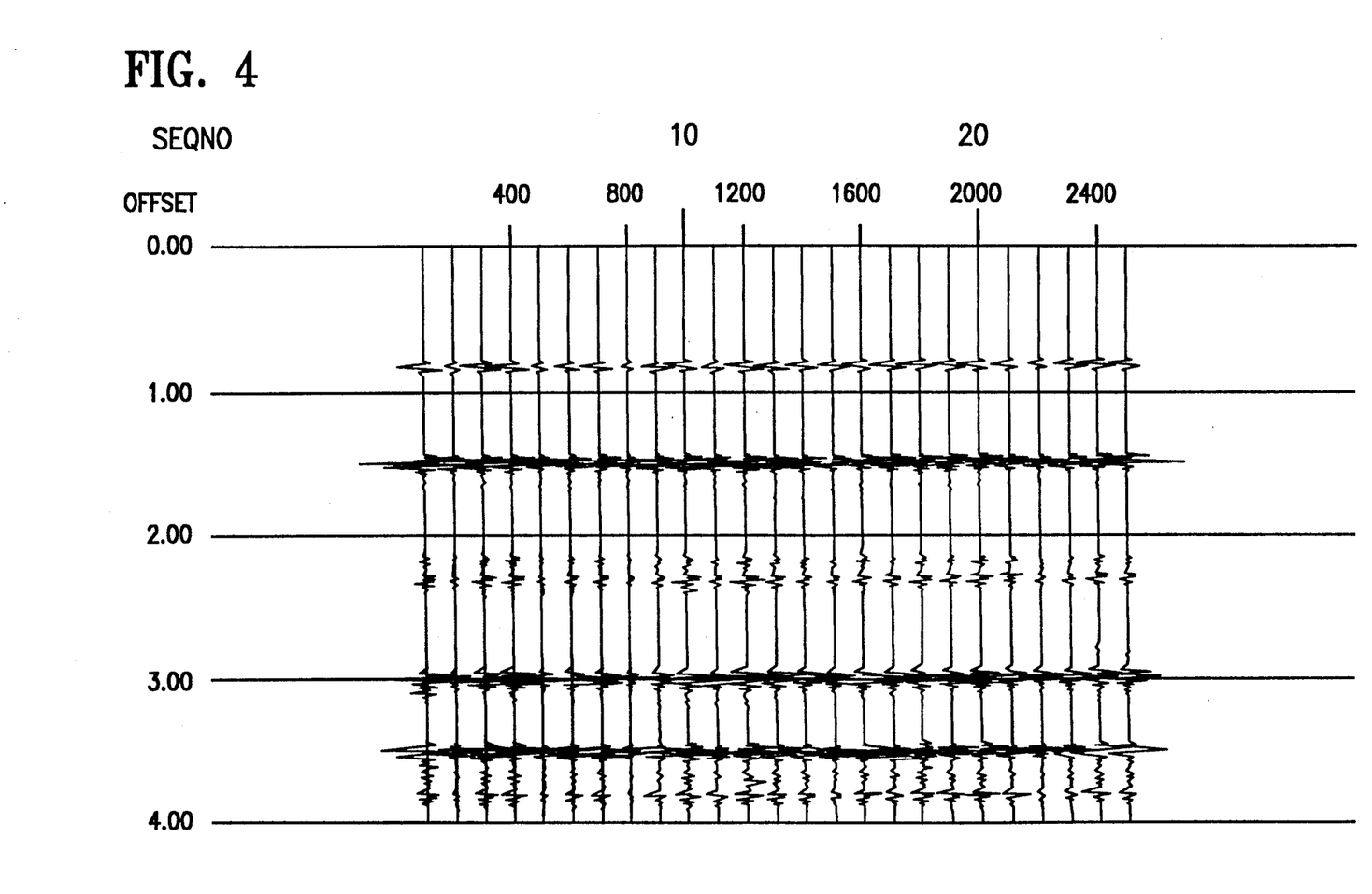
FIG. 4 shows a common offset group of simulated seismic traces arranged according to the common offset indexing scheme before application of the random noise correction method of the present invention shown in FIG. 3.

At step 120, the seismic traces in each common offset group are arranged sequentially according to shotpoint number. FIG. 4 is a display of simulated seismic traces for one common offset group. In the absence of receiver calibration errors, all the seismic traces in FIG. 4 would be identical. However, the introduction of random calibration errors and variations in source strengths has caused significant lateral variations in the amplitudes of the seismic traces. It is a specific nature of the method of the present invention to remove these lateral amplitude variations by reducing and eliminating receiver calibration errors.

Proceeding to step 130, the sample mean and sample standard deviation for each seismic trace is determined in accordance with the following:

$$\hat{\mu}_i = \frac{1}{m} \sum_{k=1}^{m} x_k^i \quad \text{and} \tag{1}$$

$$\hat{\sigma}_i = \sqrt{\frac{1}{m-1} \sum_{k=1}^{m} (x_k^i - \hat{\mu}_i)^2} , \tag{2}$$

where
- $\mu_i$ = sample mean,
- $\sigma_i$ = sample standard deviation,
- $x_k^i$ = $k^{th}$ output sample of trace i, and
- m = number of samples in the trace.

Figure 5A:
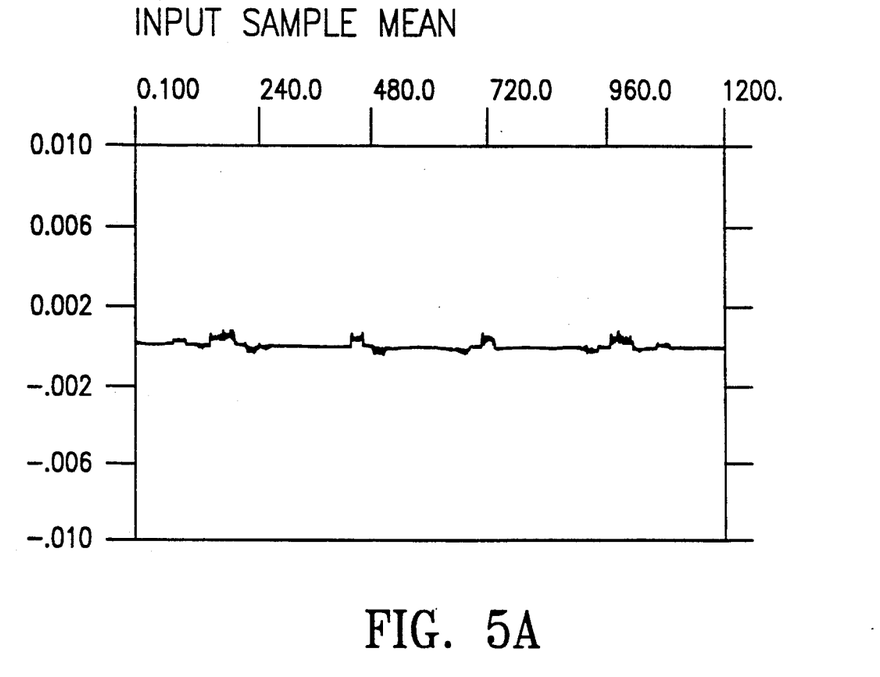
FIGS. 5A–5D are graphs of the sample mean series, the sample standard deviation series and their corresponding amplitude spectra for the noisy seismic traces of FIG. 4.
Figure 5B:
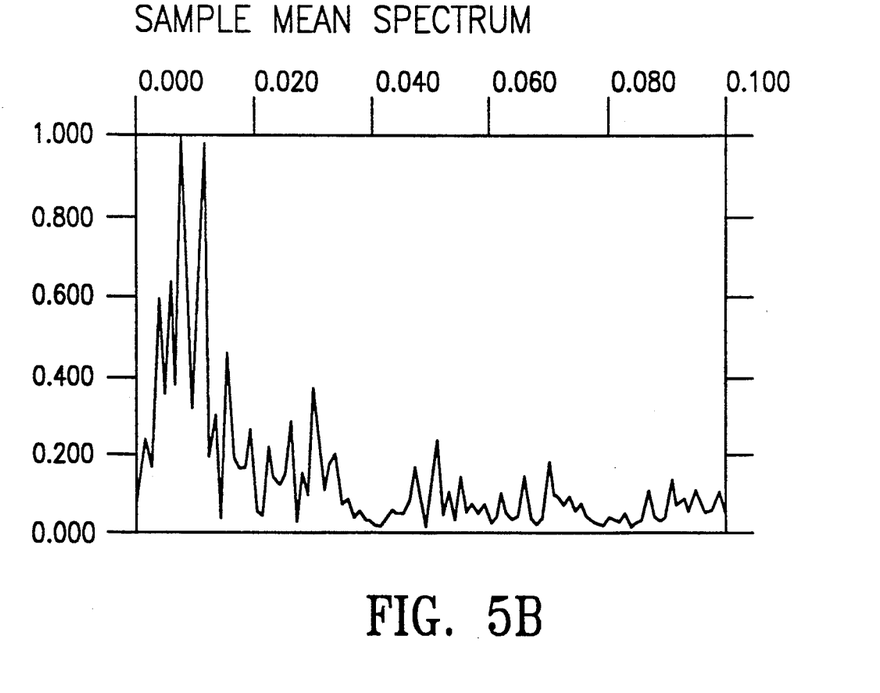

The series of sample means and sample standard deviations form a pair of sequences which are indexed according to seismic trace number. These series are the means and standard deviations for the uncalibrated receivers. FIGS. 5A–5D illustrate the sample mean and sample standard deviation series for the noisy simulated seismic traces for which a single common offset group of traces was displayed in FIG. 4. FIG. 5A shows the sample mean series as a function of trace index number. Ideally, the sample mean series should be zero, however, random calibration errors have introduced small peaks in the series. FIG. 5B displays the amplitude spectrum of the sample mean series as a function of normalized frequency. The frequency scale has been normalized so that a frequency of 0.5 corresponds to the Nyquist or folding frequency. Peaks in the amplitude spectrum at 0.04 or greater are indicative of calibration errors. Peaks at multiples of 0.04 are caused by random variations in source strength. This is because the simulated seismic line contains twenty-five source or shotpoints. The ordering scheme for indexing the traces implies that every twenty-fifth element in the sample mean and standard deviation series has the same source. Therefore, the mean and standard deviation series contain a periodicity of 25, which introduces peaks in their amplitude spectra at multiples of 1/25 or 0.04.

Figure 5C:
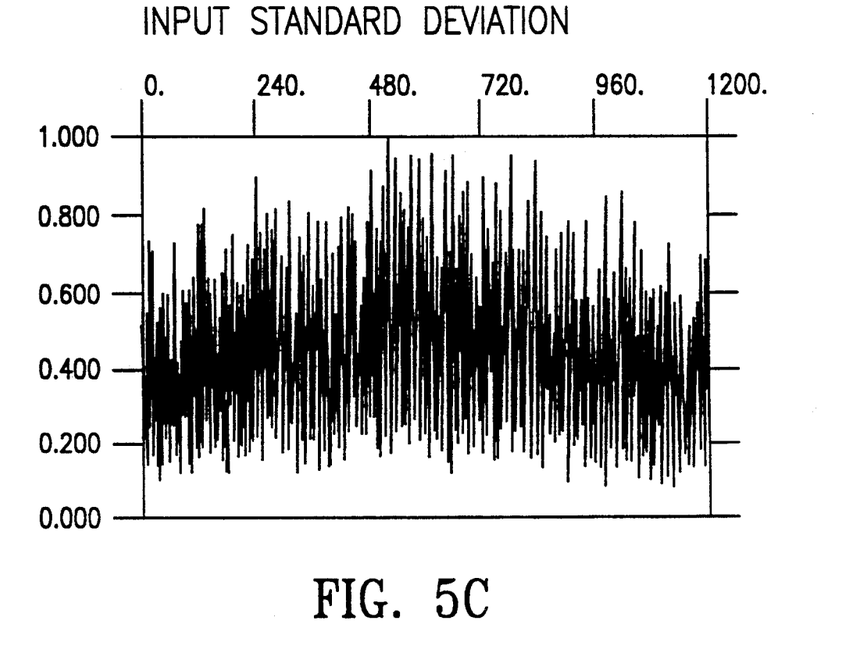
Figure 5D:
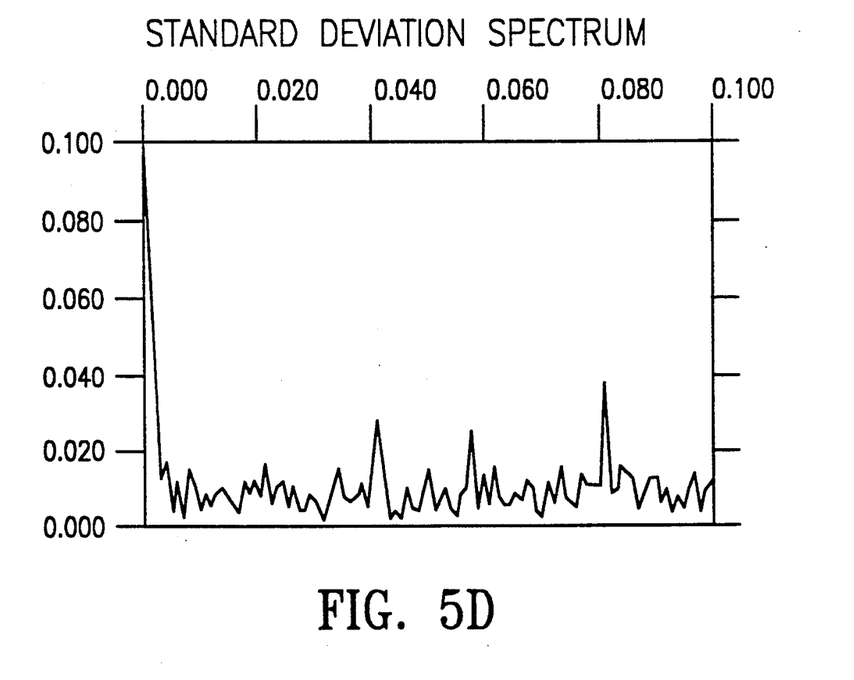

FIG. 5C shows the sample standard deviation series for the noisy seismic data. In the absence of calibration errors, the standard deviation series should vary smoothly and slowly as a function of the seismic trace index number. However, because of the random calibration errors and the variation in source strength, the standard deviation series exhibits large, rapid fluctuations. FIG. 5D shows the amplitude spectrum of the standard deviation series as a function of normalized frequency. Peaks at 0.04 and 0.08 indicate variations in source strength, and high frequency noise in the spectrum shows that calibration errors are present in the seismic data.

Figure 6A:
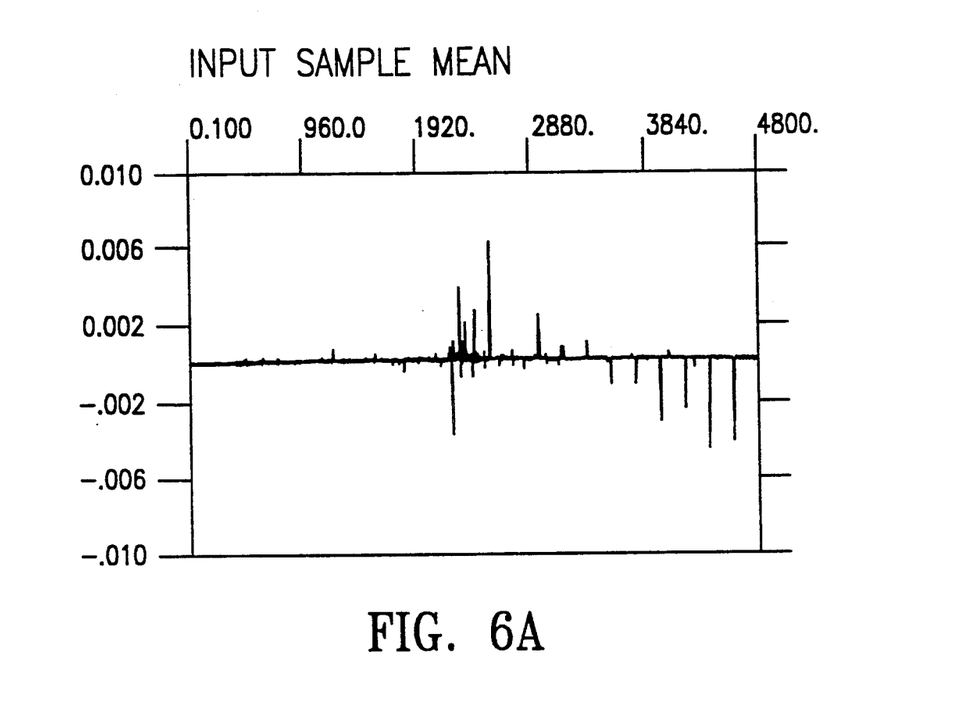
FIGS. 6A–6D are graphs of a sample mean series and standard deviation series for actual seismic data.
Figure 6B:
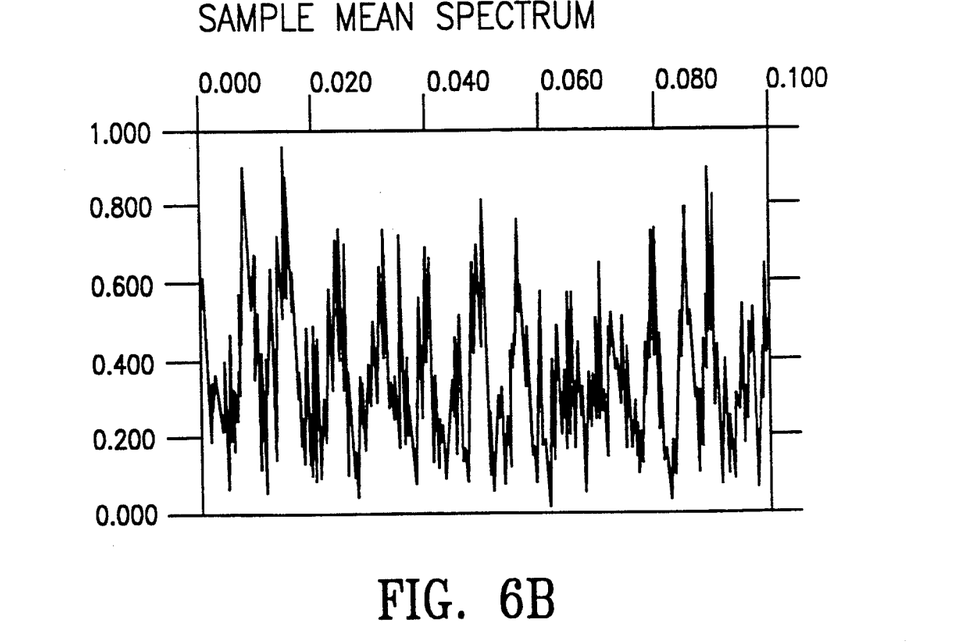
Figure 6C:
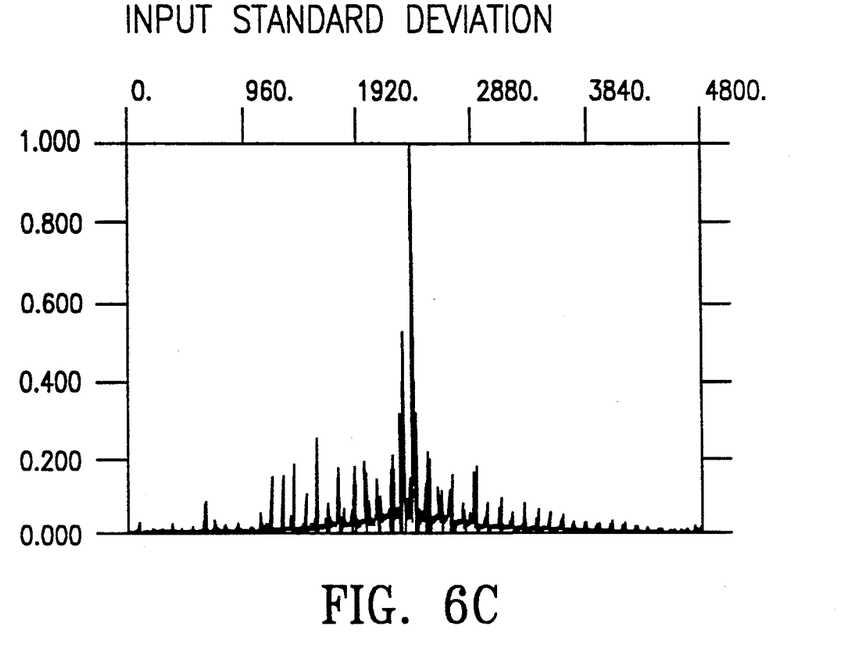
Figure 6D:
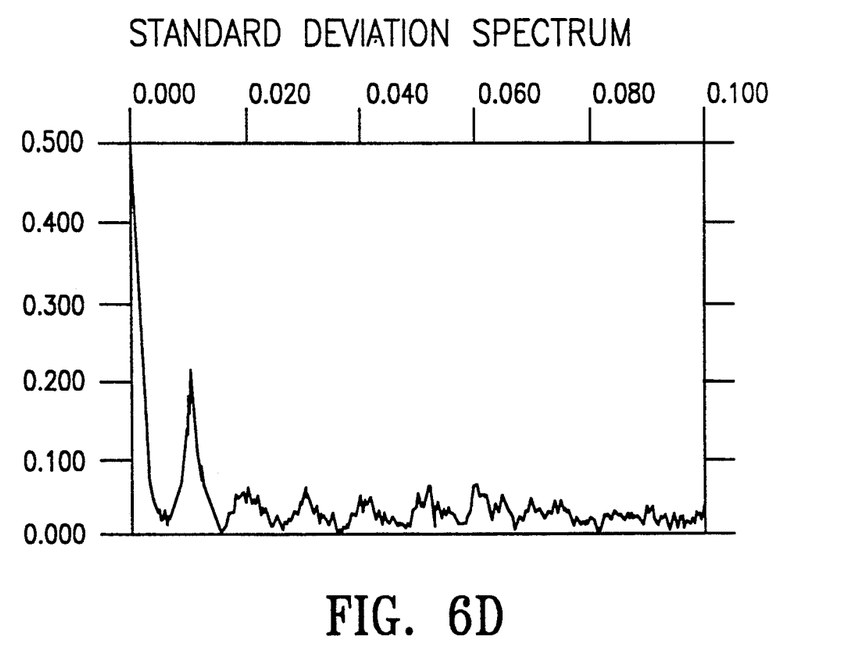

FIGS. 6A–6D show the sample mean and standard deviation series for actual seismic data. The peaks in the sample mean series of FIG. 6A are caused by random noise bursts in the seismic data. The seismic line contains 99 shotpoints. Thus the indexing scheme creates a periodicity of 99 in the sample mean and standard deviation series when receiver calibration errors are present. This implies that the amplitude spectra of the sample mean and standard deviation series will contain peaks at multiples of approximately 0.01 in the normalized frequency coordinates if variations in source strength are present. The two amplitude spectra show that there are significant peaks at these frequencies. Therefore, these seismic data are affected by variations in source strength. The large variations in the standard deviation series in FIG. 6C is evidence of uncalibrated receivers. Isolated peaks are caused by noise bursts in the seismic data. In the absence of calibration errors, the sample mean series of FIG. 6A should be approximately zero for all elements of the series. The standard deviation series of FIG. 6C should vary smoothly with a maximum at the midpoint of the series. Finally, the amplitude spectra of both series should be nearly zero for high frequencies with no source-induced peaks.

Proceeding to step 140, a low-pass filter is selected and applied to the sample mean and sample standard deviation series obtained from step 130. The objective of this filter is to eliminate the high frequency variations in the mean and standard deviation series, including the source-induced peaks in the amplitude spectra, without distorting the low frequency variations that are due to subsurface geology or wave propagation effects such as spherical spreading. While a linear filter may be utilized, a median filter, with a filter length equal to the number of sources in the seismic line, is preferable. A median filter with length equal to the number of source points will substantially reduce the high frequency effects of calibration errors and variations in source strength. Median filters also have the desirable properties that they can eliminate noise bursts or outliers in a series without affecting step-wise changes and, if the input series is positive, then the filtered output series is also a sequence of positive elements. This latter property is significant for the standard deviation series since elements of this series must always be positive.

Figure 7A:
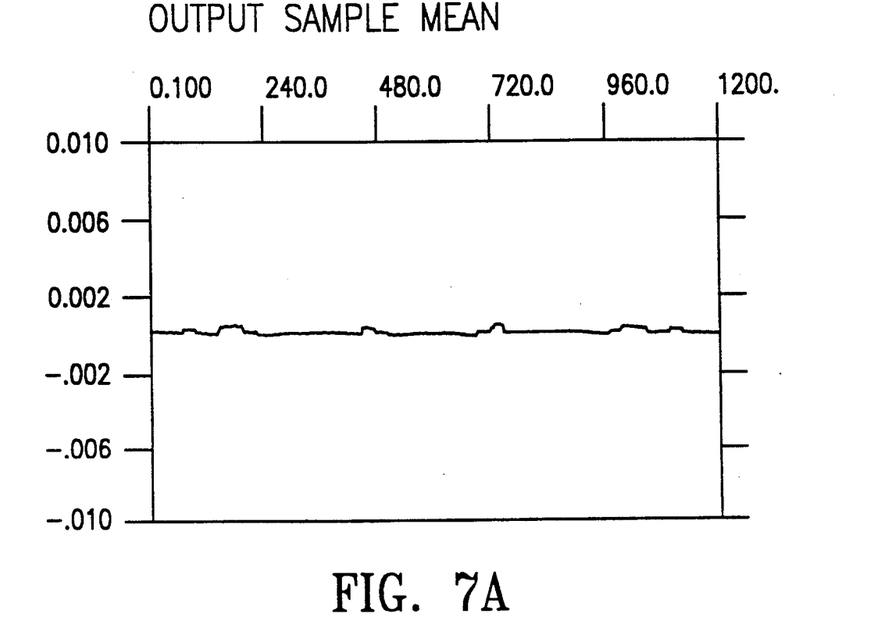
FIGS. 7A-7D are graphs of the sample mean and standard deviation series for the simulated seismic traces of FIG. 4 after application of a low-pass filter to remove random noise as shown in FIG. 3.
Figure 7B:
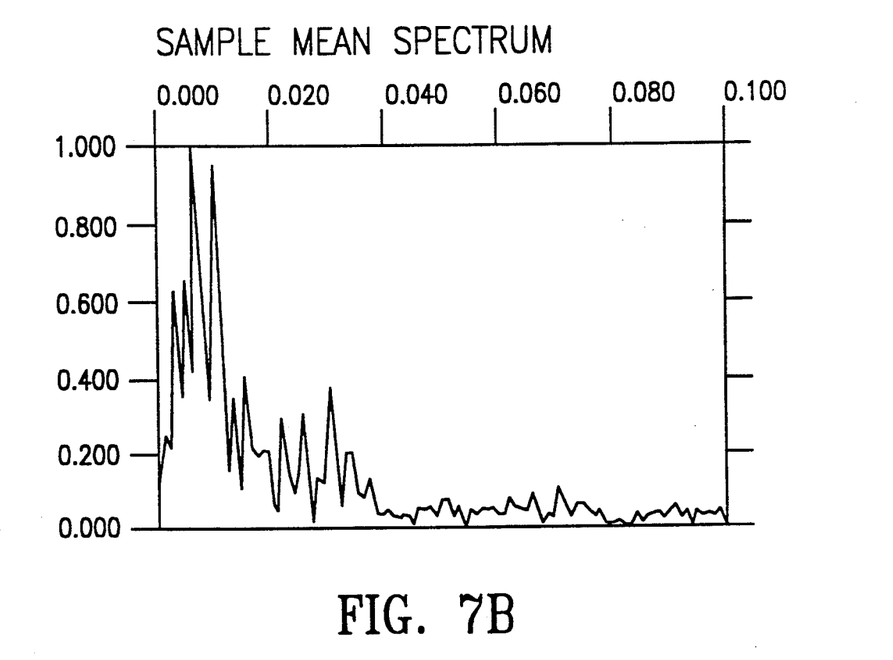
Figure 7C:
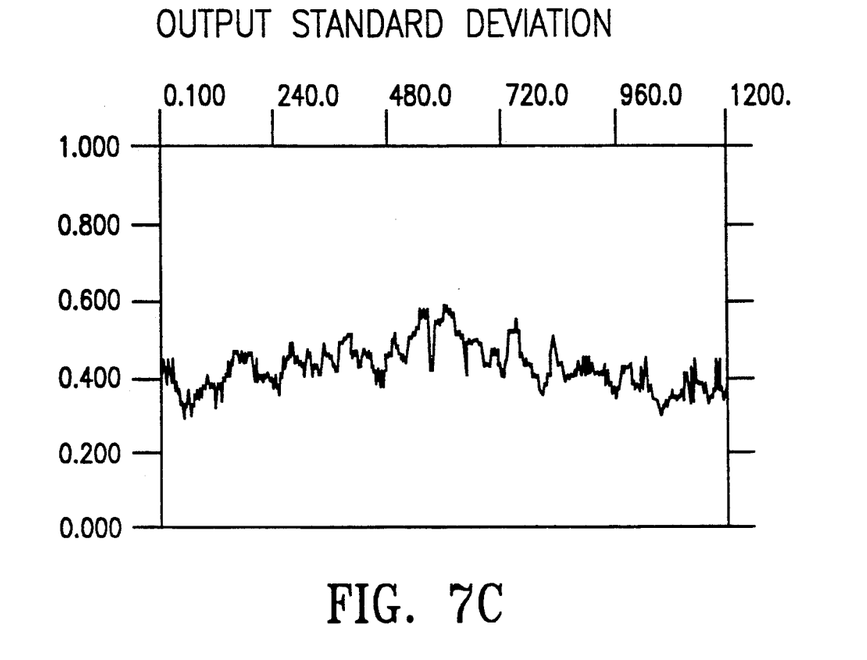
Figure 7D:
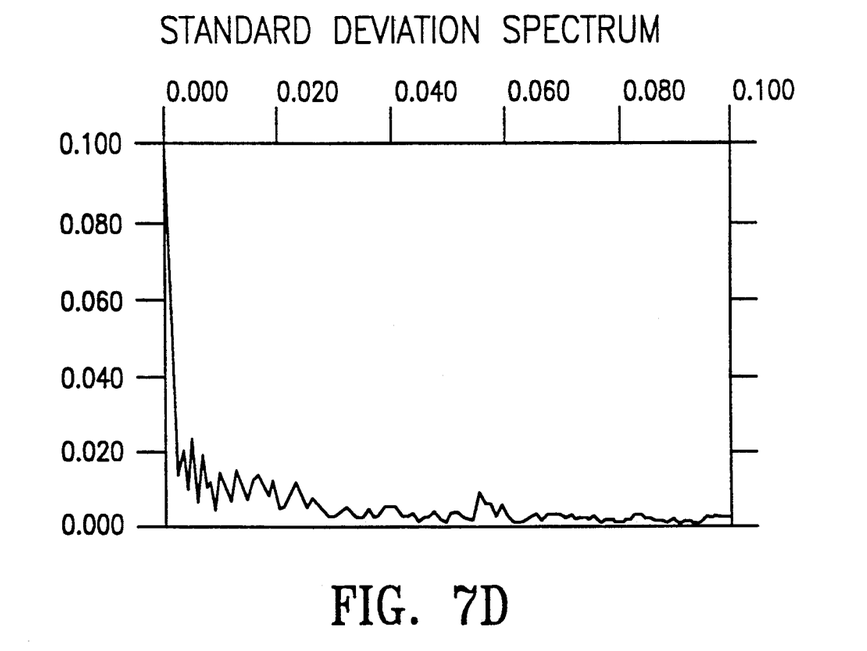

FIGS. 7A–7D show the results of applying a 25 point median filter to the mean and standard deviation series of FIGS. 5A–5D. Both the mean and standard deviation series, shown in FIGS. 7A and 7C, are much smoother and vary less rapidly than the unfiltered series in FIGS. 5A and 5C. Importantly, the amplitude spectra for both of these series, displayed in FIGS. 7B and 7D, show that the source variation peaks have been eliminated from the filtered series and the high frequency effects of calibration errors have been significantly reduced.

At step 150, each seismic trace is scaled so that its sample mean and sample standard deviation is equal to the filtered sample mean and standard deviation. That is, if $\mu_i$ and $\sigma_i$ are the mean and standard deviation of the seismic trace i, and if $\mu'_i$ and $\sigma'_i$ denote the corresponding filtered mean and standard deviation, then the equation $$y_k^i = \frac{\hat{\sigma}'_i}{\hat{\sigma}_i} (x_k^i - \hat{\mu}_i) + \hat{\mu}'_i \tag{3}$$

converts the seismic trace with elements $x_k^i$ into a seismic trace with elements $y_k^i$ such that the sample mean of the scaled trace is $\mu'_i$ and the sample standard deviation of the scaled trace is $\sigma'_i$. The result of this step is a set of seismic traces from which calibration errors are removed or reduced.

Figure 8:
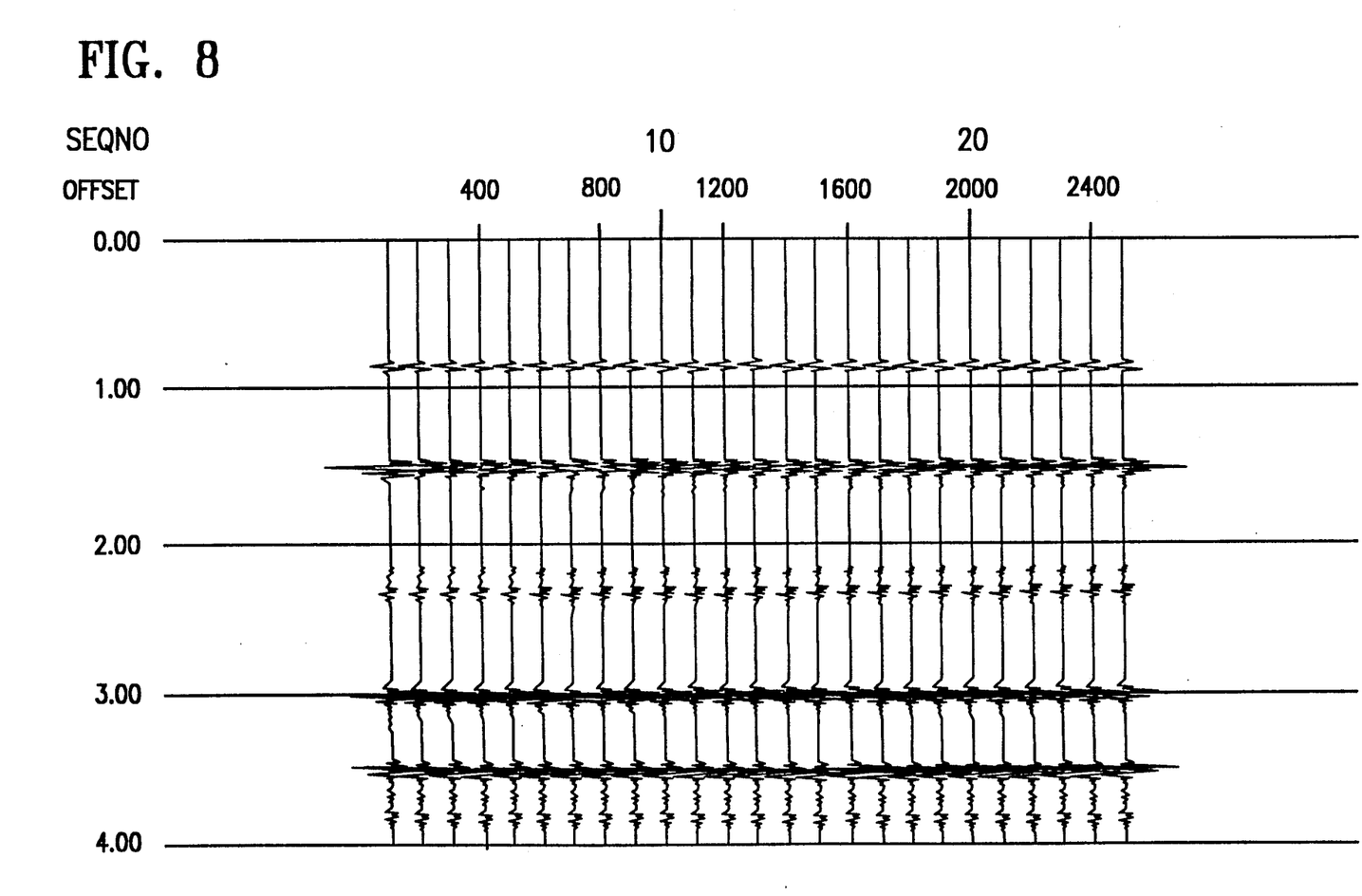
FIG. 8 is the common offset group of seismic traces that results from the noise removal method of the present invention as shown in FIG. 3. The lack of lateral amplitude variation in the seismic traces indicates that the data are now calibrated.

FIG. 8 shows the result of applying step 150 to the synthetic seismic data, for the same offset gather shown in FIG. 4. The seismic traces displayed in FIG. 8 show no lateral variation in amplitude which indicates that the method has eliminated the calibration errors that were present in the original synthetic seismic data.

Figure 9A:
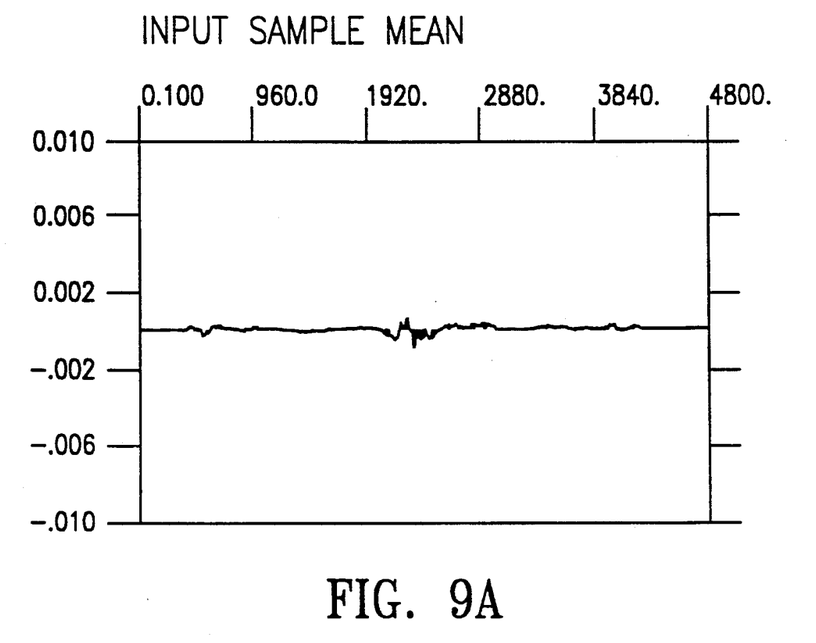
FIGS. 9A-9D are graphs of the sample mean and standard deviation series for the actual seismic traces used for FIGS. 6A-6D after application of the noise removal method of the present invention as shown in FIG. 3. The absence of large fluctuations in the sample mean and standard deviation series, and the attenuation of source variation induced peaks in the amplitude spectra indicate that the noise removal method of the present invention has eliminated calibration errors and reduced the effects of source strength variation.
Figure 9B:
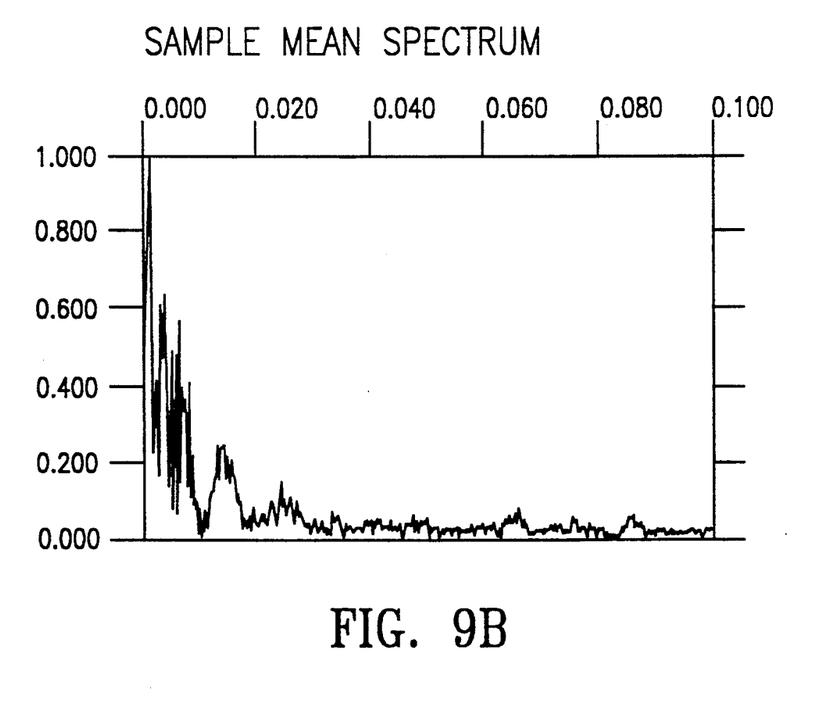
Figure 9C:
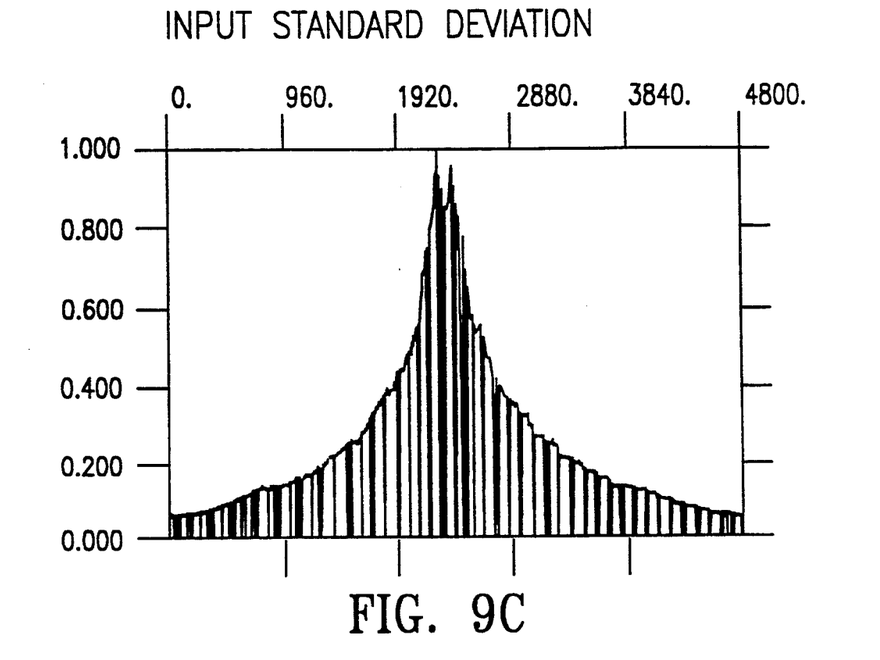
Figure 9D:
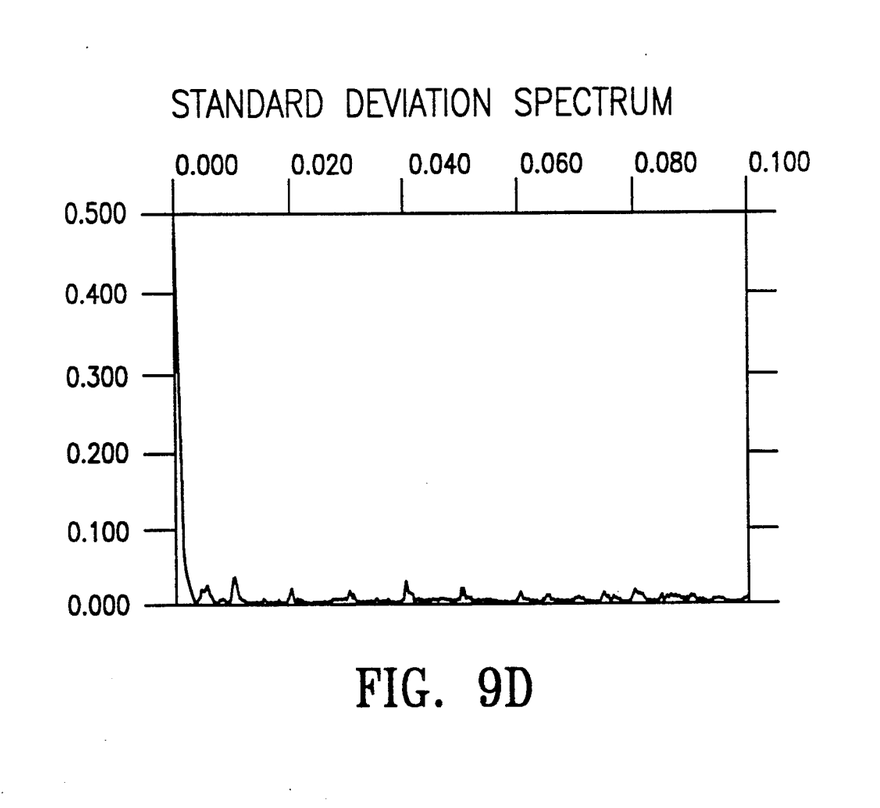

FIGS. 9A-9D show the sample mean and sample standard deviation series computed from the actual seismic data after application of the calibration method. A 99 point median filter was used in step 140 for these data. From FIG. 8 it can be seen that the calibration method has eliminated the noise spikes and the rapid fluctuations in the sample mean and standard deviation series. The amplitude spectra in FIGS. 9B and 9D show that the source variation peaks and high frequency calibration errors have been significantly reduced.

While the method of the present invention has been described above as being applied to common offset groups of seismic traces, the method may also be applied to common shotpoint groups of seismic traces. For both common offset and common shotpoint groups, receiver calibration errors cause high frequency variations in the mean and standard deviation of the receiver output signals. Therefore, a low-pass filter can eliminate receiver calibration errors from the mean and standard deviations in either common offset or common shotpoint groups. However, utilization of the common offset group has advantages over the common shotpoint group. The common offset group corrects for source strength variations in addition to receiver calibration errors. Source variations cause a very low frequency trend in common shotpoint groups and therefore are not removed by the low-pass filter. The common offset group is less sensitive to filter length than the common shotpoint group. Choosing the filter length to be equal to the number of sources will eliminate both source variations and receiver calibration errors from the mean and standard deviation in the common offset group.

Thus, there has been described and illustrated herein a method for removing random source and receiver noise from an array of seismic traces due to variations in source strengths and receiver sensitivities. However, those skilled in the art will recognize that many modifications and variations besides those specifically set forth may be made in the techniques described herein without departing from the spirit and scope of the invention as set forth in the appended claims.

We claim:

1. In seismic exploration wherein seismic sources are activated at spaced locations along a line of exploration and the amplitude of reflections from subsurface formations are recorded as a function of time and distance along said line of exploration to produce a time-distance array of seismic traces, said seismic traces comprised of seismic reflection signals and random noise, a method for processing said seismic traces to remove said random noise, comprising the steps of:
   a) gathering said seismic traces into groups having a common seismic reflection wave characteristic along the line of exploration,
   b) determining mean and standard deviations for the seismic traces within each common group of said traces,
   c) eliminating high frequency amplitude variations in said mean and standard deviations of each common group of said traces caused by random noise while maintaining low frequency amplitude variations caused by subsurface formations,
   d) using the mean and standard deviations after elimination of said high frequency amplitude variations to produce a new array of seismic traces having said random noise removed from said seismic traces.

2. In seismic exploration wherein seismic sources are activated at spaced locations along a line of exploration and the amplitude of reflections from subsurface formations are recorded as a function of time and distance along said line of exploration to produce a time-distance array of seismic traces, said seismic traces comprised of seismic reflection signals and random noise caused by variations in source strengths and receiver calibrations, a method of processing said seismic traces to remove said random noise, comprising the steps of:
   a) gathering said seismic traces into common source-to-receiver offset groups,
   b) determining mean and standard deviations for the seismic traces within each common offset group of said seismic traces,,
   c) eliminating high frequency amplitude variations in said mean and standard deviations caused by variations in source strengths and receiver calibrations, and
   d) using the mean and standard deviations after elimination of high frequency amplitude variations to produce a new array of seismic traces having said random noise removed from said seismic traces.

3. The method of claim 2 wherein the step of removing amplitude variations in said determined mean and standard deviations includes the steps of:
   a) producing a mean series by indexing the determined means within each group of traces sequentially according to shot point,
   b) producing a standard deviation series by indexing the standard deviations within each group of traces sequentially according to shot point, and
   c) filtering both said mean series and said standard deviation series with a low-pass filter to remove high frequency variations due to source strength differences and receiver calibrations while maintaining low frequency variations due to subsurface geology and wave propagation effects.

4. Method for removing amplitude variations in recorded seismic signals due to random noise effects of receiver calibration differences and source strength differences, comprising the steps of:
   a) recording seismic reflection signals from subsurface formations along a line of exploration on the earth's surface wherein a plurality of seismic energy sources and a plurality of seismic receivers are spaced-apart along said line of exploration, said seismic reflection signals being recorded as seismic traces,
   b) gathering said seismic traces into common source-to-receiver offset groups,
   c) determining a mean and a standard deviation for each seismic trace within each common offset group of said seismic traces, d) applying to the mean and standard deviations for each seismic trace a filter designed to eliminate high frequency amplitude variations due to random receiver calibration differences and source strength differences without distorting low frequency amplitude variations caused by said subsurface formations, and e) scaling each seismic trace such that its standard deviation is equal to the filtered mean and standard deviation for said trace, thereby removing amplitude variations due to receiver calibration differences and source strength differences from said trace.

5. The method of claim 4 wherein said filter is a low-pass filter.

6. The method of claim 5 wherein said filter is a linear filter.

7. The method of claim 5 wherein said filter is a median filter with a filter length equal to the number of said plurality of sources for eliminating amplitude variations caused by the effects of source strength differences.

8. The method of claim 4 wherein said mean and standard deviations of each seismic trace are determined in accordance with the following:

$$\hat{\mu}_i = \frac{1}{m} \sum_{k=1}^{m} x_k^i, \text{ and}$$

$$\hat{\sigma}_i = \sqrt{\frac{1}{m-1} \sum_{k=1}^{m} (x_k^i - \hat{\mu}_i)^2} ,$$

where
$\hat{\mu}_i$ = sample mean of trace i,
$\hat{\sigma}_i$ = sample standard deviation of trace i,
$x_k^i$ = $k^{th}$ output sample of trace i, and
m = number of samples in the trace.

9. The method of claim 4 wherein the step of scaling each seismic trace is carried out in accordance with the following:

$$y_k^i = \frac{\hat{\sigma}'_i}{\hat{\sigma}_i} (x_k^i - \hat{\mu}_i) + \hat{\mu}'_i$$

where
$\hat{\mu}_i$ = sample mean of trace i,
$\hat{\sigma}_i$ = sample standard deviation of trace i,
$\hat{\mu}'_i$ = filtered sample mean of trace i,
$\hat{\sigma}'_i$ = filtered sample standard deviation of trace i,
$x_k^i$ = uncalibrated $k^{th}$ output sample of trace i, and
$y_k^i$ = calibrated $k^{th}$ output signal of trace i.

* * * * *

UNITED STATES PATENT AND TRADEMARK OFFICE
CERTIFICATE OF CORRECTION

PATENT NO. : 5,287,328

DATED : Feb. 15, 1994

INVENTOR(S) : John E. Anderson et al.

It is certified that error appears in the above-identified patent and that said Letters Patent is hereby corrected as shown below:

```
Col. 10, line 20, in the formula below line 6, and above "σ"
insert --^--.
```

Signed and Sealed this

Fifth Day of July, 1994

BRUCE LEHMAN

Attest:

Attesting Officer

Commissioner of Patents and Trademarks